J. G. JONES.
APPARATUS FOR MAKING SULFUR DIOXID GAS.
APPLICATION FILED SEPT. 25, 1911.
1,097,177.
Patented May 19, 1914.
5 SHEETS—SHEET 1.
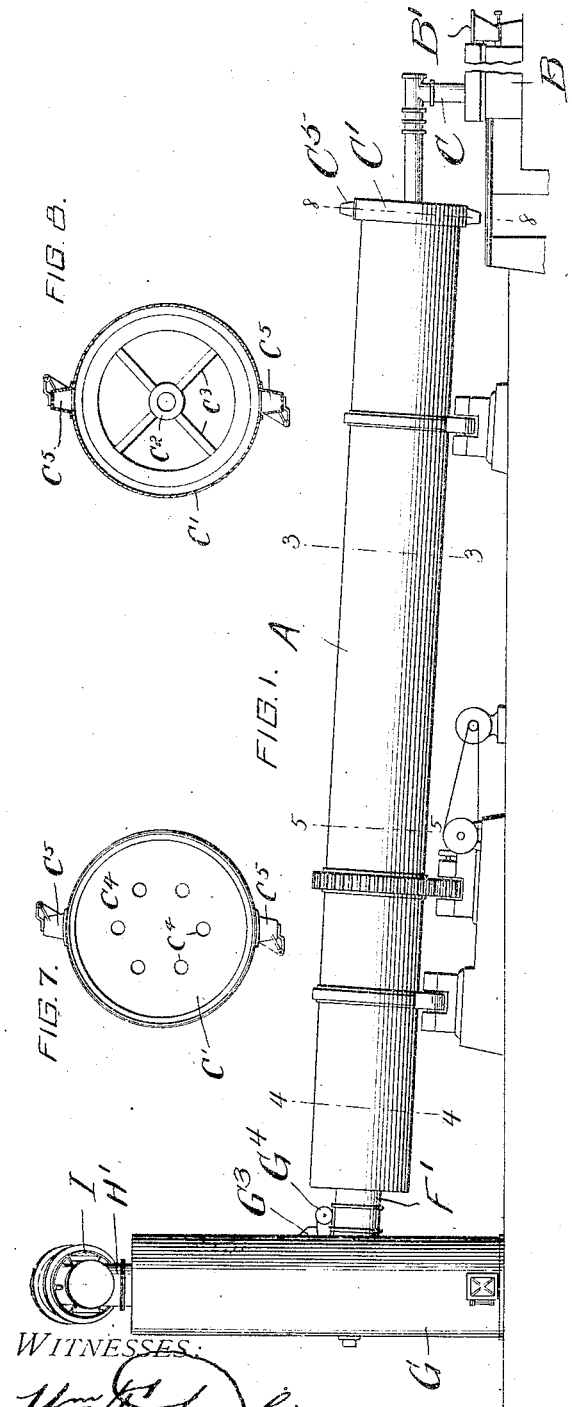
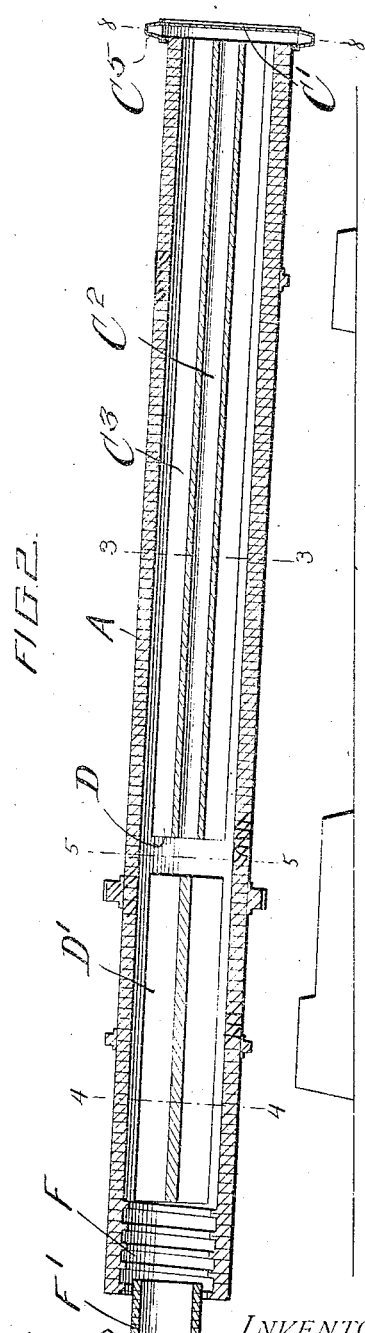

J. G. JONES.
APPARATUS FOR MAKING SULFUR DIOXID GAS.
APPLICATION FILED SEPT. 25, 1911.

1,097,177.

Patented May 19, 1914.
5 SHEETS—SHEET 2.

WITNESSES:

INVENTOR
John G. Jones
BY
Attorney

J. G. JONES.
APPARATUS FOR MAKING SULFUR DIOXID GAS.
APPLICATION FILED SEPT. 25, 1911.
1,097,177.
Patented May 19, 1914.
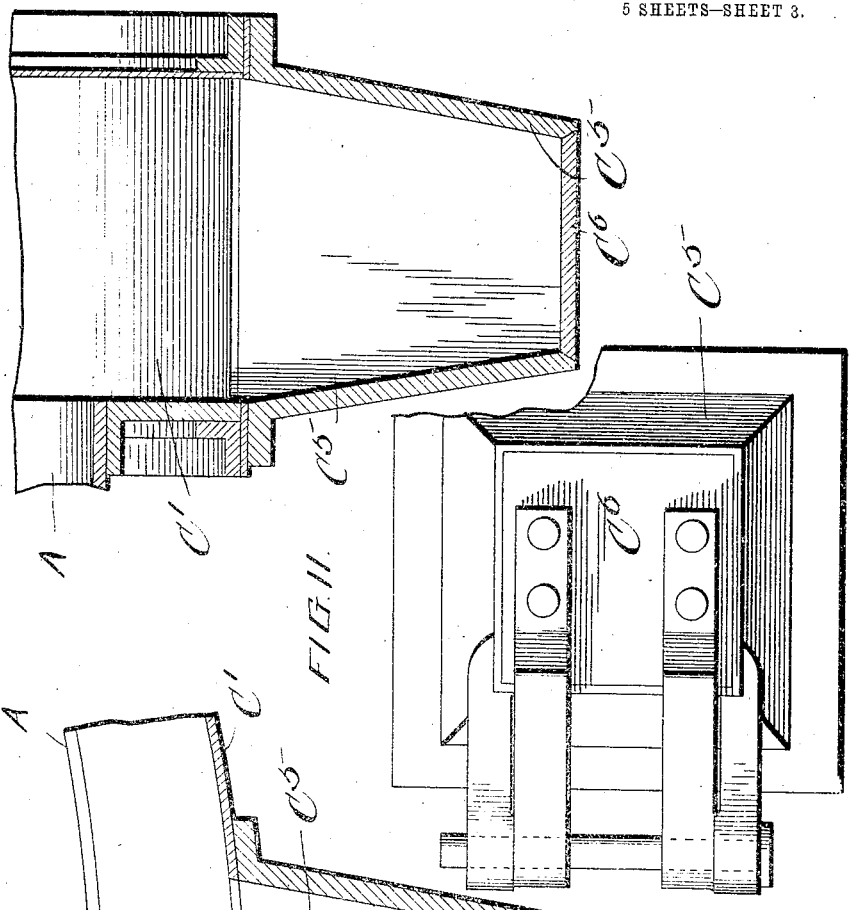
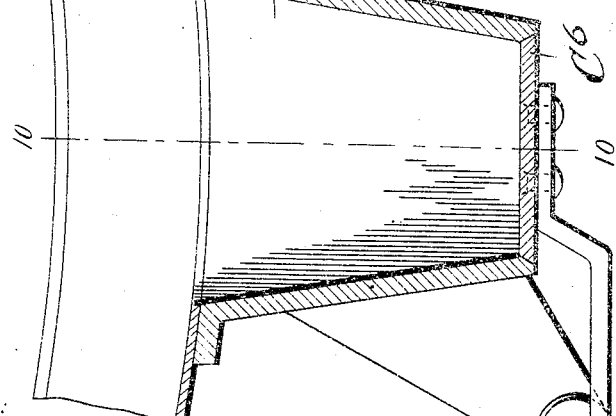

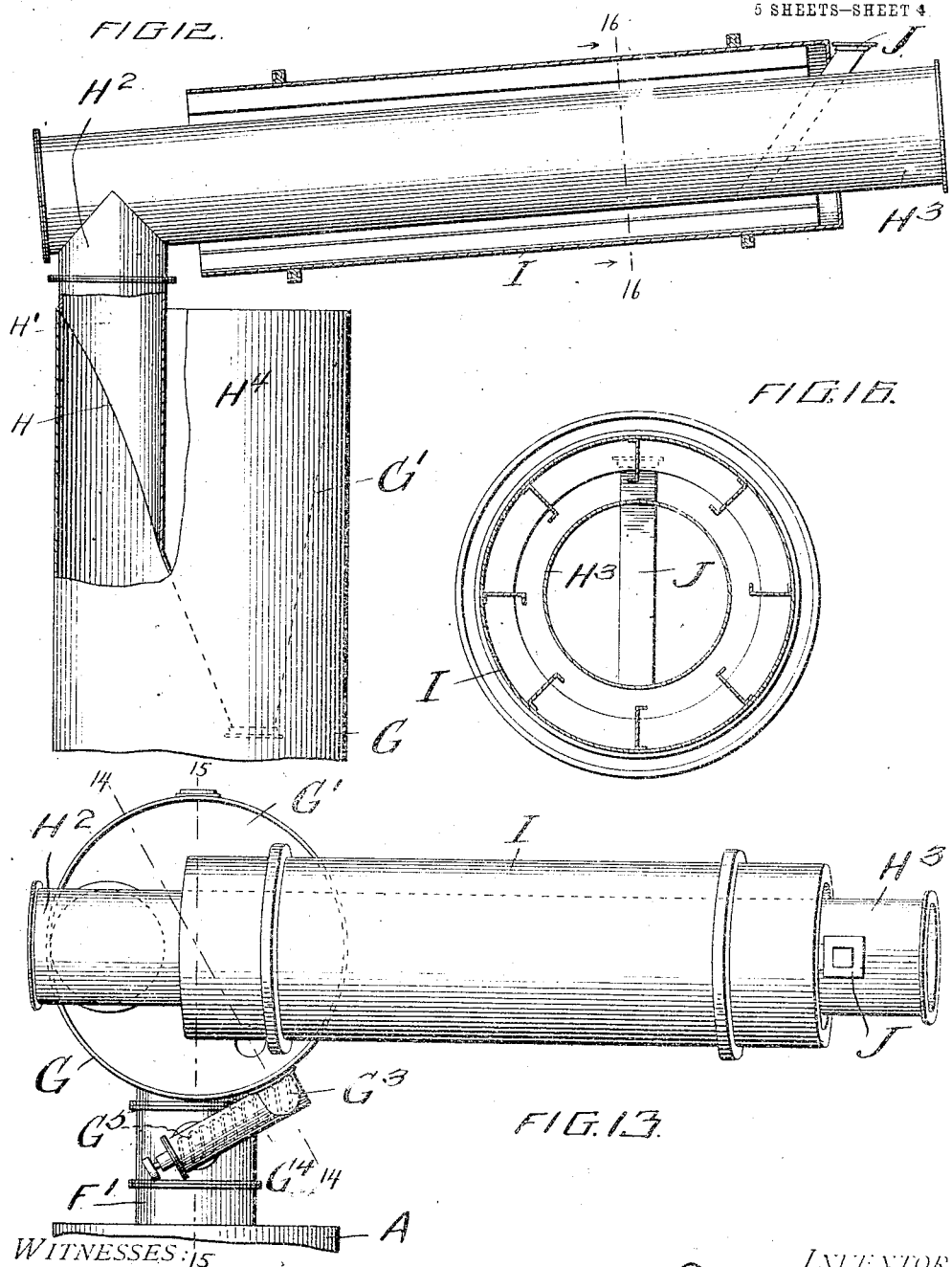

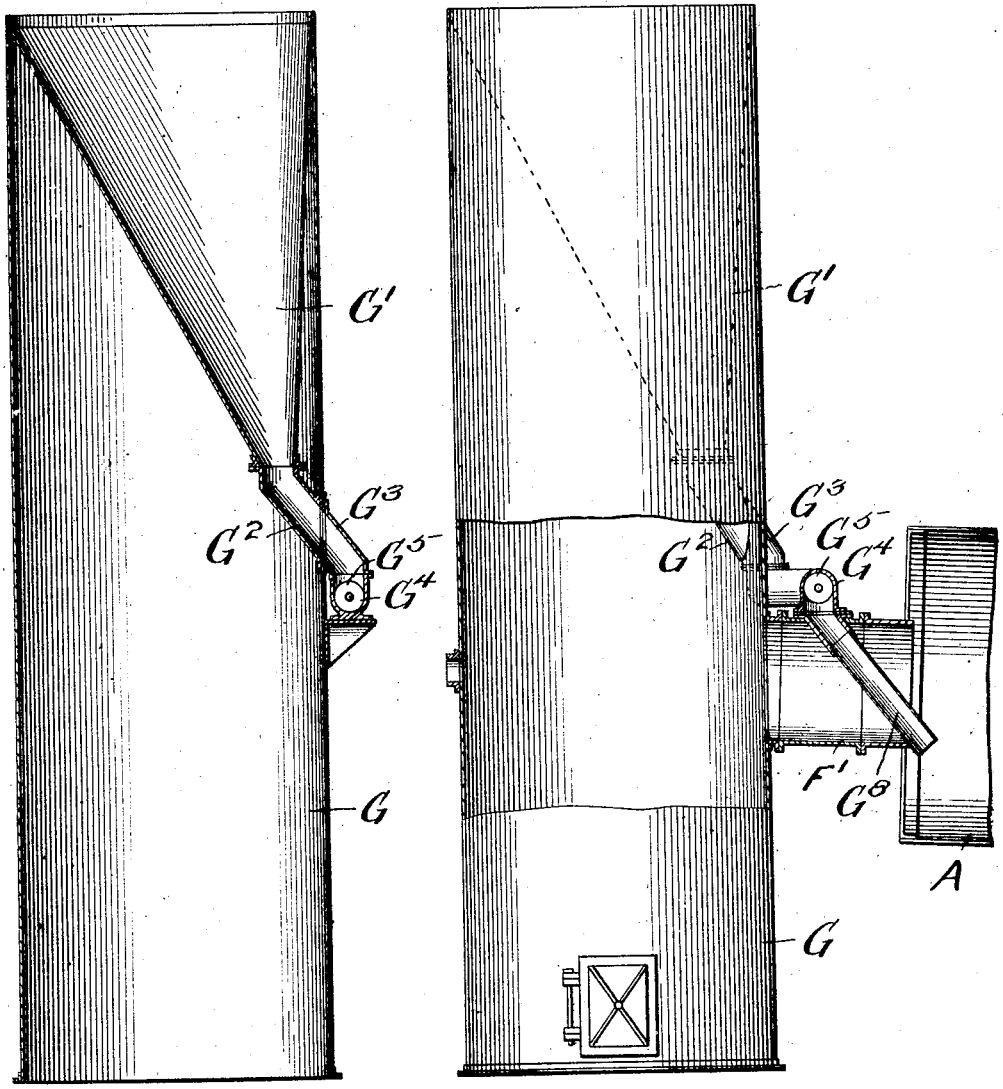

UNITED STATES PATENT OFFICE.

JOHN G. JONES, OF CARTHAGE, NEW YORK.

APPARATUS FOR MAKING SULFUR-DIOXID GAS.

1,097,177.   Specification of Letters Patent.   Patented May 19, 1914.

Application filed September 25, 1911. Serial No. 651,256.

*To all whom it may concern:*

Be it known that I, JOHN G. JONES, a citizen of the United States, residing at Carthage, in the county of Jefferson and State of New York, have invented certain new and useful Improvements in Apparatus for Making Sulfur-Dioxid Gas; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for making sulfur dioxid from sulfur bearing ores, especially from iron pyrites, the purpose of the invention being to burn the crude ores as well as the concentrates.

More specifically the present invention contemplates an apparatus whereby a compartment rotary kiln is utilized, and through which the ore is slowly fed from the burning zone, to the exit end of the kiln, a suitable passageway being provided through which the vaporized sulfur or any other heat producing material is conducted to the burning zone, wherein, the sulfur, contained in the ore, after being ignited, will burn of itself, and sulfur dioxid gas produced.

Another feature of the invention resides in the provision of means whereby the sulfur bearing ore, is heated before entering the kiln, to such a degree that the moment it enters the burning zone of the kiln, the sulfur of the ore will ignite and burn.

The invention consists further in the provision of means for separating the dust from the recovered gas, and cooling the latter.

Various other features of the invention will be hereinafter described in detail and specifically defined in the appended claim.

Figure 3:
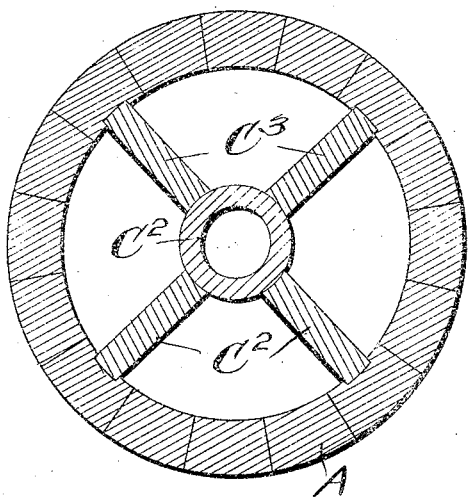
Figure 4:
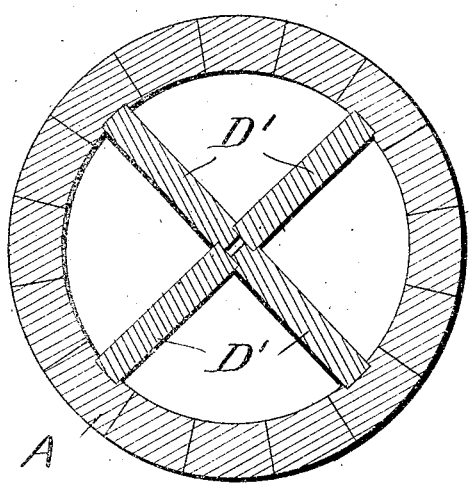
Figure 5:
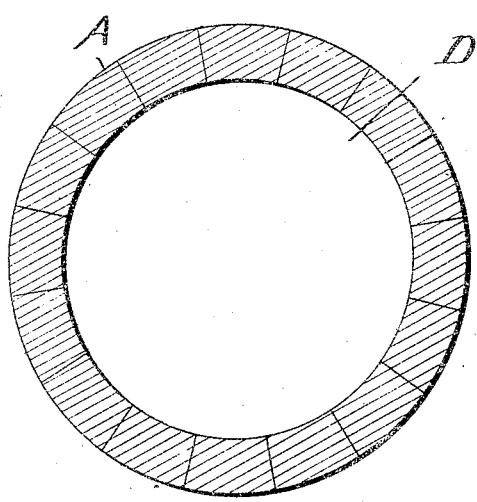
Figure 6:
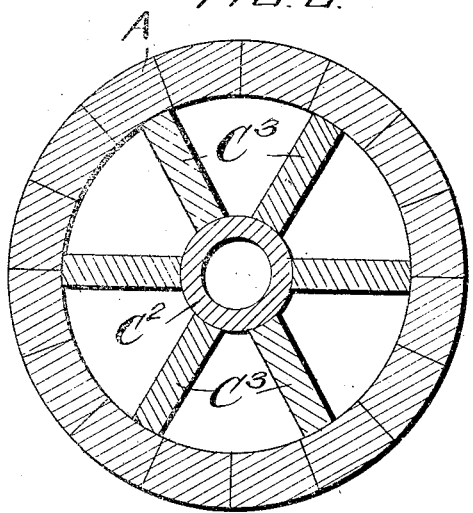

The invention is illustrated in the accompanying drawings, which, with the letters of reference marked thereon, form a part of this application, and in which, Figure 1 is a side elevation of my improved apparatus. Fig. 2 is a central longitudinal sectional view through the kiln. Fig. 3 is a cross sectional view through the kiln, taken on line 3, 3 of Fig. 1. Fig. 4 is a cross-sectional view taken on line 4, 4 of Fig. 1. Fig. 5 is a cross-sectional view taken on line 5, 5 of Fig. 1. Fig. 6, is a cross sectional view through a kiln showing a slight modification in which six radial portions are illustrated. Fig. 7 is an end view of the kiln, showing the peep holes. Fig. 8 is a cross-sectional view taken on line 8, 8 of Fig. 1. Fig. 9 is an enlarged detail sectional view taken on line 8, 8 of Fig. 1. Fig. 10 is a detail sectional view taken on line 10, 10 on Fig. 9. Fig. 11 is a face view of a gate to one of the discharge hoppers, shown in Figs. 9 and 10. Fig. 12 is a vertical sectional view through the ore hopper. Fig. 13 is a top plan view of the ore hopper, drier and a portion of the kiln with pipe connection with the ore hopper. Fig. 14 is a vertical sectional view on line 14, 14 of Fig. 13. Fig. 15 is a vertical sectional view on line 15, 15 of Fig. 13. Fig. 16 is a vertical sectional view on line 16, 16 of Fig. 12.

Letter A designates a rotary kiln mounted upon anti-friction rollers, and at a slight inclination, and is adapted to be rotated slowly in any suitable manner. A sulfur burner B is positioned adjacent to the exit end of the kiln, and comprises a concrete oven in which commercial sulfur is vaporized for the initial heat in starting the burning of the sulfur of the ore. A suitable feeding hopper B' is provided into which the sulfur is placed and from whence it is fed into the furnace. A pipe C communicates between the furnace or oven and the discharge hood C' of the kiln, and into which latter the iron cinders fall in making exit from the kiln.

It will be noted upon examination of the sectional views through the kiln, that the latter is provided with a plurality of partitions, radially arranged between a central tubular duct $C^2$ and the inner circumference of the kiln, said partitions being designated by letter $C^3$. Said partitions and the tubular duct terminate in a small chamber D forming a part of the burning zone of the kiln. A second series of radial partitions, is provided intermediate said chamber D, and the inlet end of the kiln, and designated by letter D', shown clearly in Fig. 4 of the drawings. Adjacent to the inlet end of the kiln, and upon the inner surface thereof, is formed a feeding screw or worm F, and which is provided for the purpose of feeding the ore forward into the kiln as the latter enters the inlet end of the kiln, through the pipe F'.

It will be noted upon reference to Fig. 2 of the drawings that the central tube or pipe $C^2$ has its inner end opening into a space forming a burning zone and which space is positioned preferably at some distance from the exit end of the kiln. It is very essential in the successful operation of my apparatus for burning iron pyrites that the vapors from the burning sulfur be introduced at a high degree of temperature at the burning zone rather than allowing the same to be introduced at or near the exit end of the kiln and it is further essential that the ore be heated before entering the combustion chamber, especially when treating "lean" ores for the treatment of which my apparatus is especially adapted and in which it is essential to utilize the heat from commercial sulfur in order to start the burning of the ores in the combustion zone. With this end in view, the temperature of the ore should be raised as nearly as possible to the oxidation point on the entering of the kiln. To successfully burn ore having 25 per cent. sulfur, I have found from experience that by the use of a kiln eight feet in diameter and seventy feet long, the kiln should make a complete rotation in about twelve minutes, the kiln holding at one time substantially fifty tons of pyrites.

In the operation of my kiln, it is essential to keep an excess of air from the pyrites during the oxidation of the sulfur in the combustion and for this purpose the hopper is kept closed during the feeding of the ore in the cylinder.

Upon reference to Fig. 6 of the drawings, will be seen a sectional view through a kiln, in which six partitions are provided instead of four, which may be found expedient if desired.

At the exit end of the kiln is positioned the discharge hood which provides an annular chamber having a closed end with peep holes $C^4$ therein, and at points diametrically opposite each other in the circumferential wall of the discharge hood, are the hoppers $C^5$, each having a bracket arm projecting therefrom and to which is hinged a door $C^6$, which, as the kiln revolves, will automatically open and allow the iron cinders to be dumped.

Positioned adjacent to the inlet end of the kiln, is a stack G having a circumferential opening therein with which the pipe $F'$ communicates, and through which the sulfur dioxid gas passes from the kiln to the interior of the stack. The latter is provided with a hopper $G'$ near the top of the stack, the lower end of which hopper, communicates with an inclined pipe $G^2$, secured to the inner surface of the stack and about the marginal edge of an opening in the wall thereof. Another inclined pipe $G^3$ is fastened to the outer surface of the stack, and is in registration with said opening, and leads to and communicates with a feeding cylinder $G^4$, in which is mounted a spiral feed screw $G^5$. Leading from one end of the cylinder $G^4$, is an inclined chute $G^8$, which passes through the inlet end of the kiln, and through which chute the ore enters the kiln. Said hopper $G'$ has an opening H formed in its inclined wall and a gas exit pipe $H'$ is fitted to the marginal edge of said opening H, and passes through the top of the stack and communicates with an elbow $H^2$, which in turn communicates with a pipe $H^3$ about which a rotatable ore drying cylinder I is mounted. Projecting from the inner surface of the cylinder I, are the longitudinally disposed angled wings, provided for the purpose of lifting and allowing the ore to drop as the cylinder is rotated. An ore chute J, passes through the pipe $H^3$ diagonally, and through which the ore is introduced into the interior of the cylinder I to be partially dried before it enters the hopper within the stack. The cylinder I may be rotated in any suitable manner not shown, and the ore fed automatically or otherwise into the chute J.

In operation a sufficient quantity of commercial sulfur or other heat producing material is burned within the sulfur furnace B, the vaporized sulfur or other heat producing material being conveyed through the gas flue or pipe C into the duct $C^2$ to the chamber D, where it takes fire and heats up the partitions within the kiln to an incandescent point. As the partitions $D'$ are heated to the proper temperature, the kiln is ready to receive ore from the hopper $G'$. The pyrites ore crushed preferably to about ¼ inch size and down, is fed through the chute J into the interior of the cylinder I where it is lighted by the angled wings fastened to the inner surface thereof, and allowed to fall upon the surface of the pipe $H^3$. As the pipe $H^3$ is heated to a high temperature, by reason of the sulfur dioxid gas from the kiln, being conducted through it, and the ore being thoroughly agitated by the angled wings will become rapidly dried. As the cylinder K and the gas pipe passing therethrough, are at inclinations, the ore will be fed forward, and will fall into the hopper $G'$ from whence it will be fed by gravity and by means of the worm feed, into the inlet end of the kiln.

As the ore passes through the cylinder I, the moisture given off may be drawn off by any suitable stack or fan. It has been demonstrated by actual tests, that the removal of the moisture from the ore is essential, in order to prevent the formation of sulfuric acid. After the ore has been discharged into the hopper $G'$, it again receives the heat of the gases from the kiln as the heat of the gases surround the hopper G', and the gas outlet pipe H'. The highly heated ore is then fed into the kiln by means of the worm $G^5$, and is fed forward by the threads F into the partitions D'. As the said partitions have been heated to an incandescent state, as previously stated, before the ore is admitted the ore will begin immediately to burn, and sulfur dioxid gas will be formed. If the ore be of sufficient richness to burn of its own medium, that is if it contains enough sulfur to cause it to maintain a temperature sufficient to burn out all of the sulfur contained and thoroughly oxidize the iron, then the commercial sulfur, which has been vaporized in the burner or furnace, may be discontinued, and the ore travels through the several compartments of the kiln, being discharged into the hood and hoppers connected thereto.

By the provision of the compartments, formed by the partitions a large body of ore may be carried in the kiln, and it has been demonstrated by actual test, that the dividing up of the large body of ore by the partitions as shown, is essential to the successful working of the apparatus, and it affords a much larger capacity than otherwise would be the case.

The gas formed by the oxidation of pyritic ores in the kiln may be conducted from the latter and is preferably passed through suitable dust and cooling chambers which, however, form no part of the present invention.

What I claim to be new is:—

An apparatus for making sulfur dioxid gas comprising a rotary kiln having a closed end with perforations therein, an open-ended tubular passageway extending from a space a slight distance from the perforated end of the kiln, partially through the latter, radial partitions intermediate said partition and inner surface of the kiln, dividing the same into a series of compartments, a second series of radial partitions formed within the kiln adjacent to its inlet end and spaced apart from the inner end of the tubular passageway and radial partitions and forming a combustion chamber, said passageway forming means whereby gaseous fuel may be introduced for the preliminary heating of the kiln, as set forth.

In testimony whereof I hereunto affix my signature in the presence of two witnesses.

JOHN G. JONES.

Witnesses:
 AUG V. PAPPERT,
 H. ARTHUR CONSTANTINE.